United States Patent [19]
Aubry et al.

[11] Patent Number: 4,611,971
[45] Date of Patent: Sep. 16, 1986

[54] DEVICE COMPRISING CYCLIC PLATES DRIVEN BY FLEXIBLE BLADES, FOR CONTROLLING A HELICOPTER ROTOR

[75] Inventors: Jacques A. Aubry, Cabries; Michel R. Bonfils, Saint-Cannat, both of France

[73] Assignee: Societe Nationale Industrielle et Aerospatiale, Paris, France

[21] Appl. No.: 779,341

[22] Filed: Sep. 23, 1985

[30] Foreign Application Priority Data

Sep. 26, 1984 [FR] France ............................... 84 14787

[51] Int. Cl.⁴ ........................................... B64C 27/605
[52] U.S. Cl. .................................... 416/114; 416/138; 416/140
[58] Field of Search ..................... 416/114, 98, 131 A, 416/141, 135 R, 140 A, 138 A

[56] References Cited

U.S. PATENT DOCUMENTS

| | | | |
|---|---|---|---|
| 2,677,429 | 5/1954 | Laufer | 416/114 |
| 2,689,616 | 9/1954 | Nagler | 416/114 |
| 3,288,226 | 11/1966 | Lemont et al. | 416/140 A |
| 3,378,083 | 4/1968 | Lichten et al. | 416/98 |
| 3,545,880 | 12/1970 | Mouille | 416/114 |
| 3,558,082 | 1/1971 | Bennie | 416/114 X |
| 3,734,644 | 5/1973 | Garcia | 416/114 |
| 3,933,324 | 1/1976 | Ostrowski | 416/114 X |
| 4,326,834 | 4/1982 | Ostrowski | 416/134 A |
| 4,333,728 | 6/1982 | Drees et al. | 416/140 A X |
| 4,566,856 | 1/1986 | Miller | 416/140 A X |

FOREIGN PATENT DOCUMENTS

| | | | |
|---|---|---|---|
| 521840 | 2/1956 | Canada | 416/140 A |
| 726828 | 6/1932 | France | 416/141 |
| 2528793 | 6/1983 | France | |

Primary Examiner—Everette A. Powell, Jr.
Attorney, Agent, or Firm—Armstrong, Nikaido, Marmelstein & Kubovcik

[57] ABSTRACT

A device comprising cyclic plates driven by flexible blades for controlling a helicopter rotor. The device comprises upper flexible curved blades pivotably mounted on the rotor shaft, above the rotary plate, and pivotably mounted by a ball joint on the rotary plate, so as to cause it to rotate with the rotor shaft and at least one lower flexible curved blade, pivoting on an element of the structure of the helicopter and pivotably mounted by a ball joint on the non rotary plate, so as to secure it against rotation. The transverse stiffness of the blades ensures centering of the plates whereas the longitudinal flexibility of the blades and their end pivot point allow the blades to follow the axial translational and tilting movements imparted to the plates by pilot controls pivotably mounted to the non rotary plate, and transmitted to levers controlling the angle of attack of the rotor blades by means of links pivotably mounted to the rotary plate.

16 Claims, 3 Drawing Figures

DEVICE COMPRISING CYCLIC PLATES DRIVEN BY FLEXIBLE BLADES, FOR CONTROLLING A HELICOPTER ROTOR

BACKGROUND OF THE INVENTION

1. Field of the Invention

The present invention relates to devices comprising cyclic plates for controlling the angle of attack of the blades of a helicopter lift rotor and it relates more particularly to the members of a device of this type which guide the axial translation and tilting movements of the cyclic plates with respect to a drive shaft of the rotor, as well as driving one of the plates with the shaft of the rotor and securing the other plate against rotation with respect to the structure of the helicopter.

2. Description of the Prior Art

It is well known that the angle of attack of the blades of a helicopter lift rotor, which is integral with a rotor shaft and is driven in rotation by this latter about an axis of rotation of the rotor, is generally controlled by a control device comprising two cyclic plates, disposed about the rotor shaft and one of which is a rotary plate, driven in rotation with the rotor shaft and mounted for rotation by means of at least one ballbearing on the other plate, which is a non rotary plate, secured against rotation about the axis of the rotor. On the non rotary plate are pivotably mounted the upper ends of pilot controls, for example control links or servo controls, which cause axial and pivoting movements of this plate on a mechanism guiding the axial translation and tilting of the non rotary plate with respect to the rotor shaft. Pitch control links, pivotably mounted by their upper end to levers controlling the angle of attack of the blades, are also pivotably mounted by their lower end to the rotary plate. The device finally comprises a mechanism for rotating the rotary plate and for securing the non rotary plate against rotation, comprising at least one member pivotably mounted on the one hand to the rotary plate and on the other to the rotor shaft and at least one member pivotably mounted on the one hand to the non rotary plate and on the other to a structural element of the helicopter. Thus, when the pilot controls are actuated which drive the non rotary plate, the movements of this latter are followed by the rotary plate, which transmits them to the levers controlling the angle of attack of the blades, through pitch control links.

Examples of control devices of this type are described more especially in French patents nos. 1 106 and 2 119 828.

In the control devices of this type which equip numerous modern helicopters, the mechanism for guiding the axial translation and tilting of the non-rotary plate with respect to the rotary shaft comprises a spherical ball joint, on which the non-rotary plate is mounted and tilts during cyclic variations of the pitch, the ball joint being itself mounted for axial sliding and moved along the rotor shaft during collective pitch variations, over a non rotary tubular guide surrounding the rotor shaft and which extends, upwardly, the housing of the main transmission box by means of which the rotor shaft is driven in rotation.

Each of the members of the mechanism rotating the rotary plate, which are pivotably connected thereto and to the rotor shaft, is an upper rotary compass, whose upper end is pivotably mounted on a compass driver connected for rotation with the rotor shaft, and whose lower end is pivotably mounted on the rotary plate, and each of the members of the mechanism for securing the non rotary plate against rotation, which are pivotably mounted to the non-rotary plate and to the structure of the helicopter, is a lower non-rotary compass, whose upper end is pivotably mounted to the non-rotary plate and whose lower end is pivotably mounted to the upper part of the housing connecting the rotor shaft to the main transmission box, these compasses being pivotably mounted by means of ball joints and self lubricating bearings.

The U.S. Pat. No. 4,326,834 has recently proposed a device for controlling the angle of attack of the blades of a rotor which comprises two annular control plates surrounding the rotor shaft, spaced axially apart from each other along this latter, and connected together at their outer radial periphery by compasses each formed from two flexible blades fixed together by their external radial end and fixed by their internal radial end, one to the upper plate and the other to the lower plate. Bearing means of biconical shape are mounted for rotation on each of the two plates and are engaged radially inwardly in peripheral grooves of corresponding shape comprised by two annular tracks. The track cooperating with the bearing means of the lower plate is integral with the lower end of a sleeve mounted for axial sliding on the rotor shaft and interlocked for rotation therewith by keying, whereas the track cooperating with the bearing means of the upper plate is fixed to the lower end of a truncated cone shaped tubular member, surrounding the sliding sleeve without contact therewith and diverging towards its upper end, which is fixed to the periphery of a flexible annular diaphragm, whose internal edge is fastened to the upper end of the sliding sleeve. The truncated cone shaped tubular member comprises radial arms, each of which is connected to the lever controlling the angle of attack of one of the blades of the rotor by means of a link. The pilot controls comprise a set of actuating levers, the pivoting of which controls the axial translational movements of the lower plate and these translational movements are transmitted on the one hand to the rotary sliding sleeve through the corresponding bearing members and by the corresponding rotary track and, on the other hand, to the truncated cone shaped tubular member by means of the flexible blade compasses, the upper plate, the bearing means thereof and the corresponding rotary ring, as well as the flexible diaphragm connecting the sliding sleeve to the truncated cone shaped tubular member and driving this latter in rotation, which allows variation of the collective pitch. The pilot controls also comprise control cables, whose sheaths secure the two plates against rotation about the rotor shaft so that the differential tractive forces exerted on the cables control the tilting, with respect to the lower plate and to the rotor shaft, of the upper plate and of the truncated cone shaped tubular member, which allows the cyclic variation of the pitch, the flexible diaphragm thus deformed tending to return the tubular member and the upper plate resiliently to a neutral position centered about the rotor shaft.

The diaphragm, which slides axially with the sleeve, is therefore only deformed so as to allow the cyclic variation of the pitch by tilting of the non rotary upper plate and of the rotary tubular member.

Because of its arrangement as well as the way it is secured by bolting its internal and external radial edges respectively to a collar of the rotor shaft and to the truncated cone shaped tubular member, it is doubtful whether the flexible annular diaphragm of such a device can be sufficiently deformed in a stable way to follow if only the angular movements of the upper plate, which are of the order of 15 to 30° depending on the type of helicopter.

In addition, because of the structure of the bearing members and of the cable pilot controls for the cyclic control of the pitch, the construction of such a device must be particularly carefully done and is therefore costly if it is desired to reach the degree of accuracy of the controls required on modern helicopters.

The present invention proposes then to simplify the structure and so reduce the manufacturing and maintenance costs of control devices of the type comprising two cyclic plates one of which, which is rotary, is mounted for rotation on the other which is non rotary, without however presenting the drawback of limited performances which is attached to the control devices described in the U.S. Pat. No. 4,326,834.

SUMMARY OF THE INVENTION

To this end, the cyclic plate device of the invention, for controlling the angle of attack of the blades of a helicopter lift rotor, which is integral with a rotor shaft and is driven in rotation by this latter about an axis of rotation of the rotor, and of the type comprising:

two cyclic plates, disposed about the rotor shaft and one of which is a rotary plate, driven in rotation with the rotor shaft and mounted for rotation by means of at least one ball bearing on the other non rotary plate, secured against rotation about the axis of the rotor, a mechanism for guiding the axial translation and angular movements of the non rotary plate with respect to the rotor shaft, and a mechanism for rotating the rotary plate and securing the non rotary plate against rotation, comprising at least one member pivotably mounted on the one hand to the rotary plate and on the other to the rotary shaft, and at least one member pivotably mounted on the one hand to the non rotary plate and on the other to a structural element of the helicopter, the rotary plate following all the movements of the non rotary plate, driven by pilot controls, and transmitting them to levers controlling the angle of attack of the blades through pitch control links, is particular in that the whole of the two mechanisms is formed by two sets of flexible blades which each extend substantially radially with respect to the axis of the rotor, and each of which is curved in a plane passing through the axis of the rotor with its concave side turned towards the plates, a first set of flexible blades comprising at least one blade having a transverse stiffness which allows it, on the one hand, to rotate the rotary plate on which each of the flexible blades of the first set is pivotably mounted by its external radial end, whereas its internal radial end is pivotably mounted to the rotor shaft at a fixed point thereon situated above the rotary plate and, on the other hand, to ensure centering of the plates with respect to the rotor shaft, each flexible blade of the first set also having a longitudinal flexibility which, associated with the rotations of its pivotably mounted ends, allows it to follow the translational and tilting movements which are imparted to the plates by the pilot controls, and the second set of blades comprising at least one blade having, on the one hand, a transverse stiffness which allows it to retain the non rotary plate against rotation, on which each blade of the second set is pivotably mounted by its external radial end, whereas its internal radial end is pivotably mounted to the structural element of the helicopter at a fixed point thereon situated under the non rotary blade and, on the other hand, a longitudinal flexibility which, associated with the rotations of its pivotably mounted ends, allows it to follow the translational and tilting movements which are imparted to the non rotary blade by the pilot controls.

Thus, in the device of the invention, on the one hand the mechanism for guiding and pivotably mounting the plates, formed in the most conventional state of the technique by a sliding ball joint and, on the other hand, the mechanism for driving the rotary plate and immobilizing the non rotary plate, formed in the most conventional state of the technique by pivotably mounted compasses, are replaced as a whole by the two sets of flexible and curved blades fulfilling the same functions.

In a preferred embodiment, the first set of blades comprises three blades spaced apart about the rotor shaft, whereas the second set comprises only a single blade. But the arrangement of the two sets of blades, with respect to the plates, may be reversed relatively to the preceding construction and, in this reversed arrangement, the first set of blades comprises only a single blade whereas the second set comprises three blades spaced apart about the rotor shaft.

Advantageously, each flexible blade has, at its internal radial end, a socket by means of which the blade is mounted for pivoting about a shaft perpendicular to the axis of the rotor and mounted on the rotor shaft or on the structural element of the helicopter, depending on whether the blade belongs to the first or second set of blades, whereas at its external radial end, each flexible blade has a ball joint by means of which the blade is pivotably mounted to the rotary or non rotary plate, depending on whether the blade belongs to the first or second set of blades. The ball joint may be of a conventional structure, smooth and made from metal, but may also have a laminated structure.

For housing the socket or the ball joint, and preferably both, each blade comprises a fork joint at at least one of its two ends, but preferably at both. Each flexible blade of one at least of the two sets may be made from metal, but preferably each flexible blade of at least one of the two sets of blades, and preferably of both sets, is a laminated blade, formed from a stack of layers or woven materials, crossed or not, of high mechanical strength fibers coated with a synthetic resin. In this latter case, and when the socket and/or ball joint is or are housed in an end fork joint of the blade, the framework of the fork joint is formed from layers of strengthening woven materials inserted with layers of the laminated structure of the blade between its two ends. Each laminated blade may be advantageously molded from woven material layers disposed directly on the pivotable ring and/or ball joint mounting.

In order to facilitate connection of the blades to the rotor shaft, this latter comprises, at the level of the fixed pivot point of each blade of the first set on the rotor shaft, a reinforcement in the form of a fork joint with two legs projecting radially outwardly and between the two legs of which is fitted a pivot shaft of the internal radial end of the corresponding blade.

In a first embodiment, the links controlling the pitch and the pilot controls are pivotably connected respectively to the rotary plate and to the non-rotary plate, about axes situated respectively in a transverse plane of the rotary plate and in a transverse plane of the non rotary plate, and the ball joint at the external radial end of the flexible blade or blades of at least one set of blades is mounted to the rotary or non rotary plate for pivoting about an axis situated on the one hand radially inwardly of the pins pivotably mounting the links or pilot controls to the corresponding plate and, on the other hand, respectively above said transverse plane of the rotary plate or below said transverse plane of the non rotary plate.

But it is also possible, in a second embodiment, for the ball joint pivotably mounting the external radial end of the flexible blade or blades of at least one set of blades to be centered on a pin pivotably mounting a pitch control link or a pilot control respectively to the rotary plate or to the non-rotary plate.

It is clear that the flexible and curved blades of the control device of the invention may be fitted in place of the pivotable compasses of conventional cyclic plate control assemblies.

But, preferably, these blades also replace the sliding ball joint and the plate guide of these conventional control assemblies, and in a particularly advantageous embodiment for a four blade rotor, the first set of flexible blades comprises two pairs of blades, the two blades of each pair extending in the same radial direction but on each side of the rotor shaft and perpendicularly to the radial direction of the blades of the other pair, the blades being pivotably mounted by their external radial end at the four corners of the rotary plate, in a substantially square arrangement in a plane view, and which has a central circular recess for housing a sleeve surrounding the rotor shaft without contact and interlocked for rotation with the internal ring of the ball-bearing by means of which the rotary plate is mounted for rotation on the non rotary plate. The second set of flexible blades comprises a single blade pivotably mounted by its external radial end to an apex of the non rotary plate, in a substantially triangular arrangement seen in a plane view, and to the three apices of which the pilot controls are also pivotably mounted, the non rotary plate comprising a central circular recess for housing the external ring of the ball bearing by means of which the rotary plate is mounted for rotation on the non rotary plate.

BRIEF DESCRIPTION OF THE DRAWINGS

The invention will be better understood from the embodiments described hereafter and given by way of non limitative examples with reference to the accompanying drawings in which.

DESCRIPTION OF THE PREFERRED EMBODIMENTS

Figure 1:
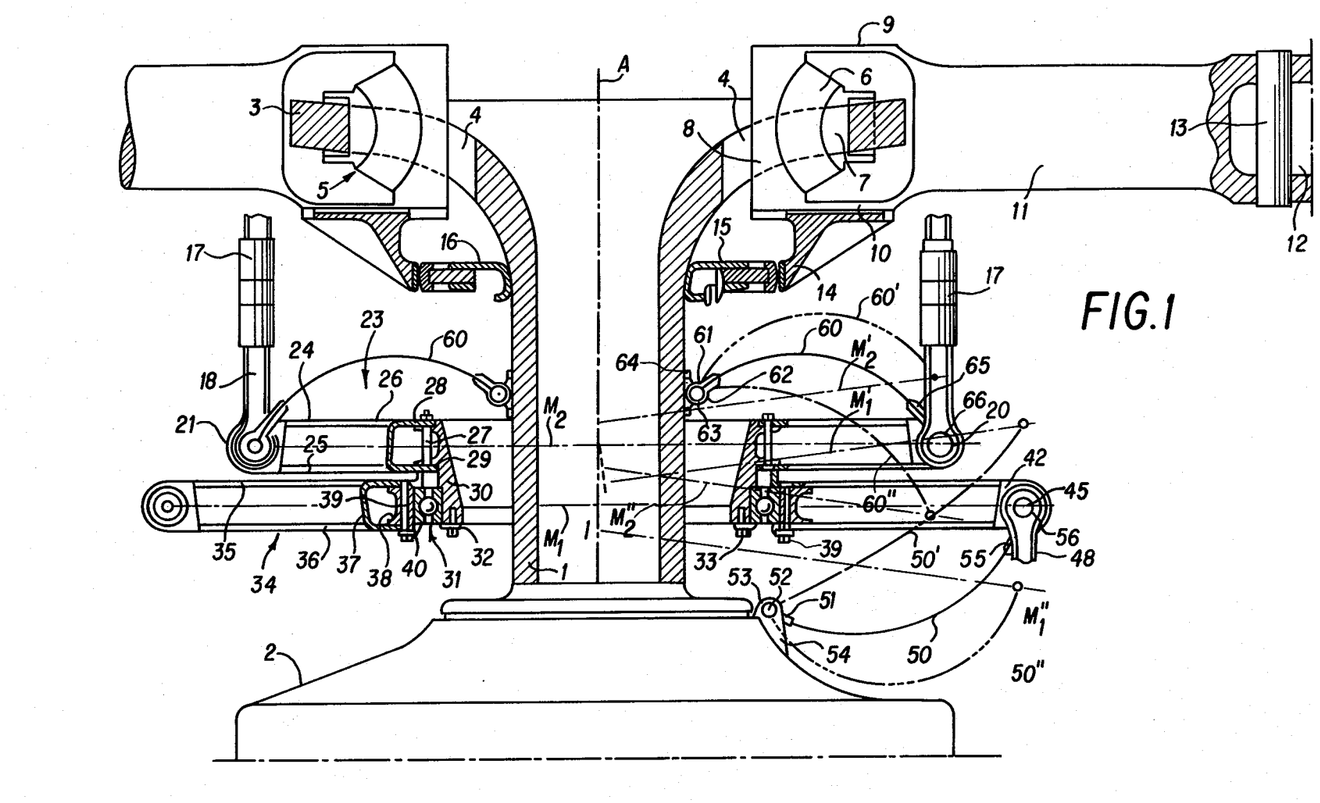
FIG. 1 is a schematical view in vertical and axial section of a helicopter rotor hub equipped with a first example of a control device in accordance with the invention.
Figure 2:
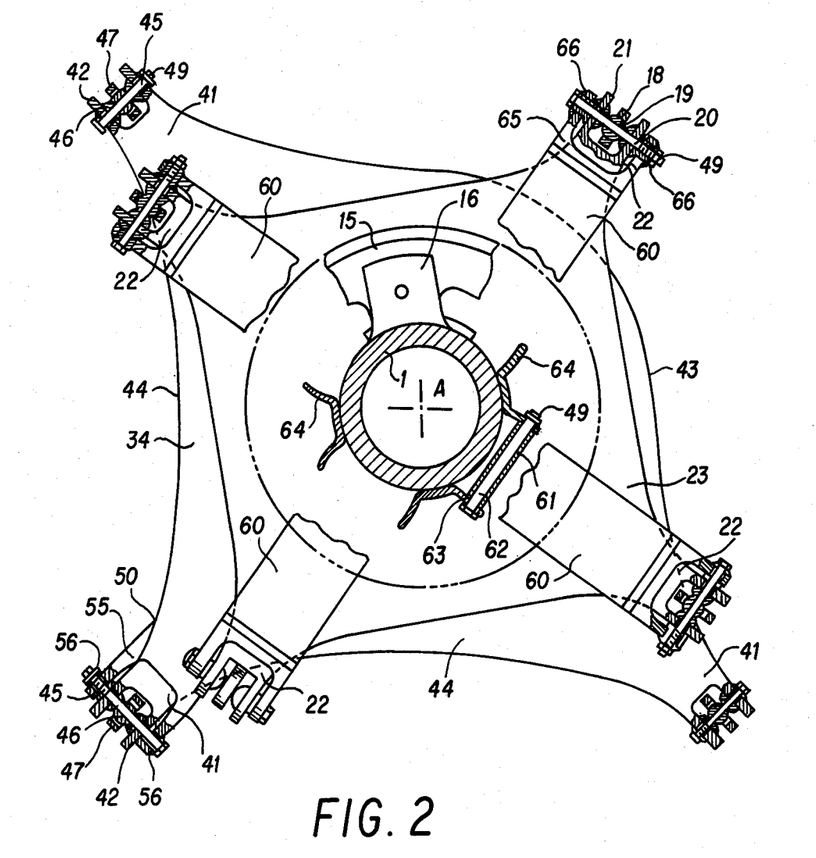
FIG. 2 is a top view of the central part of the control device equipping the rotor hub of FIG. 1.

THe helicopter rotor shown in FIGS. 1 and 2 is of a well known type, comprising a tubular rotor shaft 1 of a general cylindrical shape with circular section, driven in rotation about its axis A, which is the rotational axis of the rotor, by the main transmission box, only the upper part of the housing 2 of which has been shown, and to which the rotor shaft 1 is coupled by its lower end, inside the housing 2. At its upper end, the rotor shaft 1 is integral with a hub 3, having substantially the form of a circular or polygonal radial plate with convex sides, which comprises, in its peripheral part, as many axial openings 4 as the rotor comprises blades, for example four in this example. In each of openings 4 is housed a spherical laminated thrust piece 5, of a well known type, formed from an alternating stack 6 of rigid cups and lamina of a visco-elastic material in the form of spherical skull caps centered towards the outside, stack 6 being secured by its concave external radial face to the internal convex radial face of an external radial rigid frame 7 disposed astride the external radial edge of the corresponding opening 4 and fixed to the external radial part of the hub 3. By its convex internal radial face stack 6 is secured to the concave external radial face of an internal radial frame 8 passing substantially axially through the corresponding opening 4 and forming a strut between the upper leg 9 and the lower leg 10 of a fork joint at the internal radial end of a rotor blade sleeve 11, whose external radial end is also in the form of a fork joint with two legs 12 in which the root of a blade of the rotor is fixed by means of two pins such as 13. The lower leg 10 of the internal fork joint of sleeve 11 comprises a thrust piece 14, cooperating in a way known per se with a reciprocal ring 15 mounted for radial movement in an annular support 16 fixed about the rotor shaft 1, so as to limit the downward movement of sleeve 11 and of the corresponding rotor blade, at low or zero rotational speeds of the rotor. Each sleeve 11 also comprises, in a way known per se, a lever (not shown) for controlling the angle of attack of the corresponding rotor blade, and the free end of this lever is pivotably mounted to the upper end of a link 17 for controlling the pitch of this blade, said link being of an adjustable length so as to allow aerodynamic adjustment of the rotor. The lower end of the link 17 is shaped as an end piece 18 with ball joint 19, by means of which link 17 is pivotably mounted to the central part of a shaft 20 perpendicular to the axis A of the rotor, and mounted in a fork joint 21 the two legs of which extend radially outwardly and parallel to axis A, and which is defined by a widened wedge shaped part 22 of a rotary cyclic plate 23 having a square shape when seen in a plane view. The rotary plate 23 has a circular central recess by means of which it surrounds the rotor shaft 1 without contacting same and, as shown in FIG. 1, this plate 23 is essentially formed from two radial superimposed webs 24 and 25 connected to each other by means of fork joints 21, forming spaces at their four corners, as well as by U shaped spacers 26 which connect together the internal edges of webs 24 and 25 and are fixed with these latter, by means of a ring of screw-nut assemblies 27, to two external radial collars 28 and 29 of the upper part of a sleeve 30, comprising a truncated cone shaped central passage whose small base is turned downwardly and which surrounds the rotor shaft 1 without contacting same. The lower part of this sleeve 30 comprises, in its external face, a circular housing in which the internal ring of a ball bearing 31 is locked in rotation with sleeve 30 by means of a ring 32, forming an internal radial thrust piece for this internal ring of bearing 31, and applied against the base of sleeve 30 by screws 33. The external ring of bearing 31 is locked in rotation with a non rotary cyclic plate 34 which extends under the rotary plate 23. Substantially similar to this latter, the non rotary plate 34 which surrounds the rotor shaft 1 without contact, is essentially formed from two radial webs 35 and 36, having a substantially triangular shape when seen in a plane view, which will be discussed below, with a central circular recess and whose internal radial edges are connected together by U shaped spacers 37. These latter and the internal edges of webs 35 and 36 are fixed to an annular spacer 38, fitted between the internal edges of webs 35 and 36 by means of screw-nut assemblies 39 which also apply, against the lower web 36 and against the external ring of bearing 31, a ring 40 forming the external radial thrust piece for bearing 31. The two webs 35 and 36, seen in a plane view, have the shape shown in FIG. 2 which is substantially that of a triangle whose parts forming the apices 41 are widened and shaped as fork joints 42 with two radial legs directed outwardly and parallel to axis A, and which form spacers connecting together the external radial ends of webs 35 and 36. Two of the three apices 41 are diametrically opposite with respect to axis A and their adjacent side 43 is convex and rounded radially outwardly. The third apex 41 is offset at 90° with respect to the other two and its two adjacent sides 44 are concave and slightly rounded radially inwardly. A pin 45, perpendicular to axis A, is mounted in each fork joint 42 and on this pin 45 is pivotably mounted the ball joint 46 of an end piece 47 of the upper end of one of the three control links 48, only one of which is partially shown in the right hand half of FIG. 1, and which form the pilot controls driving the non rotary plate 34 at three points offset by 90°. In a way known per se, the three control links 48 drive the non rotary plate 34 on the one hand in an axial translational movement, parallel to axis A, for controlling a collective variation of the angle of attack of the rotor blades and, on the other hand, with an oscillating movement with respect to axis A for controlling a cyclic variation of the angle of attack of the rotor blades, and the rotary plate 23, mounted for rotation on the non rotary plate 34 through ball bearings 31 and sleeve 30, follows the movements of the non rotary plate 34 and transmits them through links 17 to the pitch control levers integral with the rotor blade sleeves 11.

The non rotary plate 34 is secured against rotation about the rotor shaft 1 by a single flexible blade 50, having a rectangular shape when it is not deformed and whose longitudinal median plane extends substantially radially. The flexible blade 50 is curved in a plane passing through axis A of the rotor so as to present its concave side towards the plates 23 and 24, between the pivoting point of its internal radial end on the upper part of housing 2, substantially below the internal radial edge of plate 34, and the pivot point of its external radial end on pin 45 mounted in the fork joint 42 of the wedge shape 41 which is opposite the radially outwardly bulging side 43 on the non rotary plate 34. The internal end of blade 50 is in the shape of a fork joint 51 housing a steel socket 52, by means of which blade 50 is mounted for pivoting about a pin 53 perpendicular to axis A and to the radial plane in which is contained the longitudinal and median plane of plate 50. This pin 53 is held between the two legs of a fork joint 54 projecting axially upwardly from the upper part of the fixed housing 2. The external end of blade 50 is also in the shape of a fork joint 55, whose two legs, parallel to the legs of the fork joint 42 of the plate 34 and outwardly thereof, each support one of the two spherical skull cap shaped portions 56 of a ball joint, these two ball joint portions 56 being mounted swivelling on pin 45 and centered on the middle of this pin 45, i.e. on the center of the ball joint 46 of the end piece 47 of the upper end of the corresponding control link 48.

Blade 50 has a transverse stiffness such that it retains plate 34 with respect to the fixed housing 2 and prevents it from rotating about axis A. In addition, its longitudinal flexibility and its end pivot points allow it to follow the translational and tilting movements imparted to plate 34 by the three control links 48.

The rotary plate 23 is driven in rotation with the rotor shaft 1 by means of four flexible blades 60, similar to blade 50, of a shape also rectangular in the undeformed state, and grouped together in two pairs of blades 60 extending on each side of the rotor shaft 1, so that their longitudinal median plane is situated substantially in the same radial plane passing through axis A and perpendicular to the longitudinal median plane of the other two blades 60. Each of the blades 60 is curved in a plane passing through axis A, so that its concave side is turned towards plates 23 and 34, between the pivot point of its internal radial end on the rotor shaft 1, at a fixed point on the periphery thereof which is situated above the rotary plate 23, and the pivot point of its external radial end on the pin 20 of fork joint 21 of one of the four corners 22 of the rotary plate 23. The internal end of each blade 60 surrounds a steel socket 61 which is pivotably engaged and held on a shaft 62, perpendicular to the axis A and to the longitudinal median plane of blade 60, between the two branches 63, parallel to axis A, of a fork joint projecting radially outwardly of the rotor shaft 1 and which is formed by the two facing parts of two U shaped reinforcements 64 adjacent each other among the four reinforcements which are evenly spaced apart about the periphery of the rotor shaft 1 and fixed to the external lateral face thereof. The external end of each blade 60 is quite similar to that of blade 50; it is in the shape of a fork joint 65 whose two legs, parallel to the legs of the fork joint 21 of the corresponding corner 22 of the rotary plate 23, and outwardly thereof, each support one of the spherical skull cap shaped portions 66 of a ball joint, these two ball joint portions 66 being mounted swivelling on the shaft 20 and centered on the middle thereof, i.e. on the center of the ball joint 19 of the end piece 18 of the corresponding pitch control link 17.

The four blades 60 have a transverse stiffness such that they drive the rotary plate 23 in rotation with the rotor shaft 1, whereas their longitudinal flexibility and their end pivot points allow them to follow the tilting and axial translational movements of plates 23 and 34. In addition, the transverse stiffness of blades 60 is sufficient for these blades also to provide centering of plates 23 and 34 on axis A, about the rotor shaft 1. The set of blades 60 thus provides guiding for the plates 23 and 34 in their axial and pivoting movements with respect to the rotor shaft 1, as well as driving plate 23, whereas plate 34 is secured against rotation by blade 50 because of its transverse stiffness. In FIG. 1, $M_1$ and $M_2$ designate the transverse median planes (perpendicular to axis A) of plates 34 and 23 in the neutral position of the control links 48. If these latter are operated so as to tilt upwardly the righthand part of plates 23 and 34 in FIG. 1, the positions of the median planes are indicated at $M'_1$ and $M'_2$, and blades 50 and 60 occupy respectively the positions indicated at 50' (less curved) and 60' (more curved). On the other hand, if links 48 cause the right hand part of plates 23 and 34 to pivot downwards, as shown at M″₁ and M″₂, blades 50 and 60 occupy the positions 50″ (more curved) and 60″ (less curved). In this embodiment, it should be noted that pins 20 and 45 pivotably mounting links 17 and blades 60 on the rotary plate 23 and links 48 and blade 50 on the non rotary plate 34 are contained in the median planes M₂ and M₁. If the translational and tilting movements of the cyclic plates 23 and 34 may be followed by blades 50 and 60 which are deformed, it is on the one hand because of the flexibility of these blades promoted by their curved shape and, on the other hand, because of the possibility which is given them of pivoting about pins pivotably mounting their ends. The blades urged by torsional forces during tilting of plates 23 and 34 do not oppose such tilting because of the pivoting ball joint at the external radial end of blades 50 and 60.

Blades 50 and 60 may be made from metal or from composite materials and have a laminated structure. In this latter case, they are molded into shape by stacking layers or woven materials crossed or not of high mechanical strength fibers encased in a synthetic resin, the arrangement of the layers being chosen so as to give to blades 50 and 60 the desired characteristics of transverse stiffness and longitudinal flexibility. These layers or woven materials may be disposed directly on sockets 52 and 61 at the internal end of blades 50 and 60, and reinforcing layers or woven materials may be inserted, at the level of the ends of blades 50 and 60, with the layers forming the laminated structure between the two ends, so as to form the framework of the fork joints in which sockets 52 and 61 and the ball joint portions 56 and 66 are housed. These latter may have a laminated structure.

Figure 3:
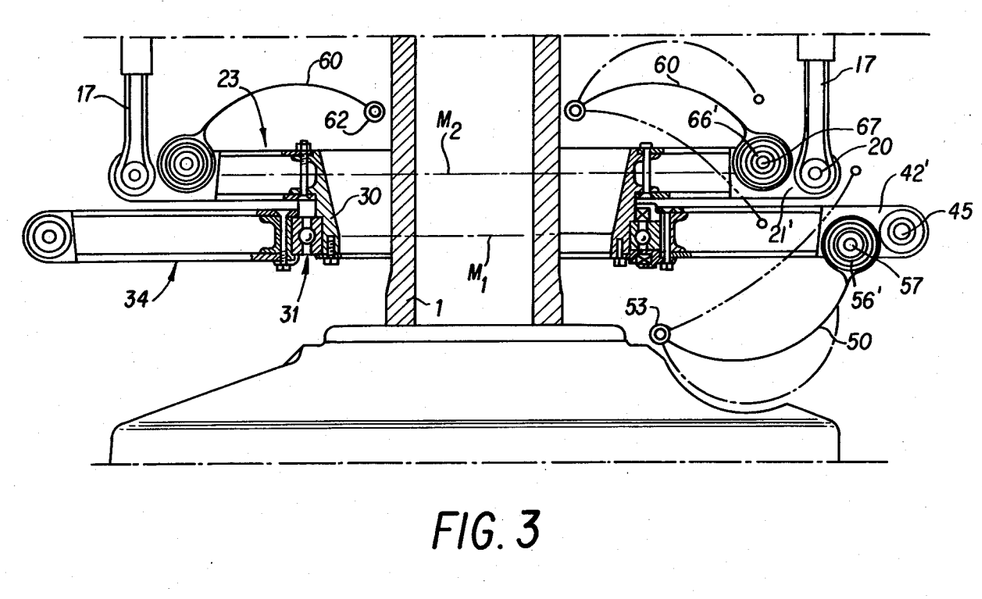
FIG. 3 is a partial view similar to FIG. 1 of a rotor hub equipped with a second example of a control device in accordance with the invention.

In the embodiment described above with reference to FIGS. 1 and 2, shafts 20, 45, 53 and 62 are formed by pins whose shank end is threaded and on which is screwed a nut 49, preferably held by a keeper pin so as to hold the pin in a suitable position on a corresponding fork joint. The second example of a device for controlling the angle of attack of the rotor blades, comprising flexible blades, and which is shown in FIG. 3, has numerous characteristics in common with the embodiment which has just been described with reference to FIGS. 1 and 2. Thus, the same numerical references, possibly bearing a prime symbol, are used for designating the similar elements.

The essential difference presented by this second embodiment with respect to the first one is that ball joints 56′ and 66′ at the external radial end respectively of the lower flexible blade 50 and of the upper flexible blades 60 are not mounted on shaft 45 and on shafts 20 by means of which a pilot link and the pitch control links 17 are respectively pivotably mounted to the lower non rotary plate 34 and to the upper rotary plate 23, but ball joint 56′, of a laminated structure, pivotably mounts the external end of blade 50 about a shaft 57, mounted on fork joint 42′, which is double, at the level of the corresponding apex of the non rotary plate 34 and this shaft 57 is parallel to shaft 45 pivotably mounting the corresponding control link, but is situated radially inside shaft 45 and under the median plane M₁ of this plate 34 in which shaft 45 is situated, as is clearly shown in FIG. 3.

In a substantially symmetrical way a ball joint 66′, of laminated structure, mounts the external end of each blade 60 for pivoting about a shaft 67 mounted on the double fork joint 21′, at the level of the corresponding corner of the rotary plate 23, and this shaft 67 is parallel to shaft 20 pivotably mounting the corresponding pitch control link 17 to this fork joint 21′, but being situated radially inside the shaft 20 and above the median plane M₂ of the rotary plate 23 in which shaft 20 is situated.

For the remainder, the device is practically identical to the one shown in FIGS. 1 and 2 and it operates exactly in the same way.

What is claimed is:

1. In a device comprising cyclic plates for controlling the angle of attack of the blades of a helicopter lift rotor which is integral with a rotor shaft and driven in rotation by this latter about an axis of rotation of the rotor, the device comprising:

two cyclic plates disposed about the rotor shaft and one of which is a rotary plate driven in rotation with the rotor shaft and mounted for rotation by means of at least one ball bearing on the other non rotary plate secured against rotation about the axis of the rotor, a mechanism for guiding the non rotary plate in axial translation and angular movement with respect to the rotor shaft, and a mechanism for driving the rotary plate in rotation and securing the non rotary plate against rotation, comprising at least one member pivotably mounted on the one hand to the rotary plate and on the other to the rotor shaft and at least one member pivotably mounted on the one hand to the non rotary plate and on the other to a structural element of the helicopter, the rotary plate following all the movements of the non rotary plate, driven by pilot controls and transmitting them to levers controlling the angle of attack of the rotor blades through pitch control links, the whole of said two mechanisms is formed by two sets of flexible blades which each extends substantially radially with respect to the axis of the rotor and each of which is curved in a plane passing through said axis of the rotor while presenting its concave side towards said plates, a first set of blades comprising at least one blade having a transverse stiffness which allows it, on the one hand, to drive the rotary plate in rotation on which each of the blades of the first set is pivotably mounted by its external radial end, whereas its internal radial end is pivotably mounted to the rotor shaft at a fixed point thereon situated above said rotary plate and, on the other hand, to ensure centering of said plates with respect to the rotor shaft, each blade of said first set also having a longitudinal flexibility which, associated with the rotation of its pivotably mounted ends, allows it to follow the translational and tilting movements which are imparted to the blades by said pilot controls, and said second set of blades comprising at least one blade having, on the one hand, a transverse stiffness which allows it to hold said non rotary plate against rotation, on which each blade of the second set is pivotably mounted by its external radial end, whereas its internal radial end is pivotably mounted to the structural element of the helicopter at a fixed point thereon situated under the non rotary plate and, on the other hand, a longitudinal flexibility which, associated with the rotation of its pivotably mounted ends, allows it to follow the translational and tilting movements which are imparted to the non rotary plate by said pilot controls.

2. The device as claimed in claim 1, wherein said first set of blades comprises three flexible curved blades spaced apart about said rotor shaft, whereas said second set of blades comprises a single flexible curved blade.

3. The device as claimed in claim 1, wherein said first set of blades comprises a single flexible curved blade whereas said second set of blades comprises three flexible curved blades spaced apart about said rotor shaft.

4. The device as claimed in claim 1, wherein each flexible blade comprises, at its internal radial end, a socket by means of which the blade is mounted for pivoting about a shaft perpendicular to the axis of the rotor and mounted on the rotor shaft or on the structural element of the helicopter, depending on whether the blade belongs to said first or said second set of blades.

5. The device as claimed in claim 1, wherein each flexible blade comprises, at its external radial end, a ball joint by means of which the blade is pivotably mounted to the rotary or non rotary plate depending on whether said blade belongs to said first or said second set of blades.

6. The device as claimed in claim 5, wherein said ball joint has a laminated structure.

7. The device as claimed in claim 4, wherein each blade comprises, at at least one of its ends, a fork joint intended to house the corresponding pivoting socket or ball joint.

8. The device as claimed in claim 1, wherein each flexible blade of one at least of said two sets of blades is made from metal.

9. The device as claimed in claim 8, wherein each flexible blade of one at least of said two sets of blades is a laminated blade, formed by a stack of layers or woven materials crossed or not of high mechanical strength fibers coated with a synthetic resin.

10. The device as claimed in claim 7, wherein the framework of said fork joint is formed of layers of reinforcing woven material inserted with layers of the laminated structure of the blade between its two ends.

11. The device as claimed in claim 10, wherein each laminated blade is molded into shape from woven material layers disposed directly on the socket and/or the pivoting ball joint.

12. The device as claimed in claim 1, wherein, at the level of the fixed pivot point of each blade of said first set on the rotor shaft, this latter has a reinforcement in the form of a fork joint with two legs projecting radially outwardly, and between which is engaged a pivot shaft for the internal radial end of the corresponding blade.

13. The device as claimed in claim 1, wherein said pitch control links and said pilot controls are pivotably mounted respectively to the rotary plate and to the non rotary plate about shafts situated respectively in a transverse plane of said rotary plate and in a transverse plane of said non rotary plate, and the ball joint at the external radial end of the flexible blade or blades of at least one set of blades is mounted on the rotary or non rotary plate for pivoting about a shaft situated, on the one hand, radially inside the pivot shafts of said links or said pilot controls on the corresponding plate and, on the other hand, respectively above said transverse plane of said rotary plate or below said transverse plane of said non rotary plate.

14. The device as claimed in claim 1, wherein said ball joint pivotably mounting the external radial end of the flexible blade or blades of at least one set of blades is centered on a shaft pivotably mounting a pitch control link or a pilot control respectively on said rotary plate or on said non rotary plate.

15. The device as claimed in claim 1, wherein said first set of flexible blades comprises two pairs of blades, the two blades of each pair extending in the same radial direction but on each side of said rotor shaft and perpendicularly to the radial direction of the blades of the other pair, said blades being pivotably mounted by their external radial end at the four corners of said rotary plate, having a substantially square shape in a plane view, and which has a circular central opening for housing a sleeve surrounding said rotor shaft without contact and interlocked for rotation with the internal ring of the ball bearing by means of which said rotary plate is mounted for rotation on said non rotary plate.

16. The device as claimed in claim 1, wherein said second set of flexible blades comprises a single blade mounted by its external radial end for pivoting on an apex of said non rotary plate of a substantially triangular shape in a plane view, and on the three apices of which said pilot controls are also mounted, said non-rotary plate having a central circular recess for housing the external ring of the ball bearing by means of which said rotary plate is mounted for rotation on said non-rotary plate.

* * * * *

UNITED STATES PATENT AND TRADEMARK OFFICE
CERTIFICATE OF CORRECTION

PATENT NO. : 4,611,971
DATED : September 16, 1986
INVENTOR(S) : JACQUES A. AUBRY ET AL It is certified that error appears in the above-identified patent and that said Letters Patent is hereby corrected as shown below:

Column 1, line 50, change "1 106" to --- 1 049 106 ---.

Signed and Sealed this

Fourteenth Day of April, 1987

Attest:

DONALD J. QUIGG

*Attesting Officer*  *Commissioner of Patents and Trademarks*